United States Patent [19]

Stiles et al.

[11] 4,033,929

[45] July 5, 1977

[54] PLASTIC SKIN ENVELOPES FOR GLASS BOTTLES AND THE LIKE

[75] Inventors: Claude J. Stiles, Tuscola; Daniel Tomo, Arthur, both of Ill.

[73] Assignee: National Distillers and Chemical Corporation, New York, N.Y.

[22] Filed: Jan. 14, 1974

[21] Appl. No.: 433,169

[52] U.S. Cl. .............................. 264/45.9; 215/12 R; 264/54; 264/173; 264/230; 264/321; 264/DIG. 5; 264/DIG. 71; 428/35; 428/315; 428/910; 428/913

[51] Int. Cl.² .................. B29C 27/20; B29D 27/00; B65D 11/16

[58] Field of Search .......... 264/47, 342 R, DIG. 71, 264/321, 230, 173, 45.9, DIG. 5, 54; 215/12 R; 428/35, 315, 910, 913

[56] References Cited

UNITED STATES PATENTS

| 2,936,491 | 5/1960 | Hamlin | 264/230 X |
|---|---|---|---|
| 2,980,963 | 4/1961 | Makowski | 264/230 X |
| 3,126,680 | 3/1964 | Baird et al. | 264/230 X |
| 3,448,182 | 6/1969 | Derbyshire et al. | 264/230 X |
| 3,470,046 | 9/1969 | Verdin | 264/230 X |
| 3,473,682 | 10/1969 | Studen | 215/12 R |
| 3,551,540 | 12/1970 | Pellicciari et al. | 264/230 X |
| 3,604,584 | 9/1971 | Shank | 215/12 R |
| 3,608,006 | 9/1971 | Hosoda et al. | 264/321 |
| 3,611,669 | 10/1971 | Shepherd | 264/321 |
| 3,760,046 | 9/1973 | Schwartz et al. | 264/171 |
| 3,767,496 | 10/1973 | Amberg et al. | 264/342 |
| 3,878,960 | 4/1975 | Jonsson | 215/12 R |
| 3,906,070 | 9/1975 | Lajovic | 264/230 X |
| 3,979,000 | 9/1976 | Karabedian | 428/315 X |

FOREIGN PATENTS OR APPLICATIONS 954,069   4/1964   United Kingdom ................ 264/47

*Primary Examiner*—Philip Anderson
*Attorney, Agent, or Firm*—Kenneth D. Tremain

[57] ABSTRACT

A method of producing a lightweight, strong, uniform, foamed layer containing tubular film with good opacity which can be heat-shrunk onto an annular substrate such as a glass bottle rapidly and uniformly is accomplished by co-extruding a low density polyethylene and a mixture of an ethylene polymer and a blowing agent under particular conditions and causing the blowing agent to decompose thereby foaming the ethylene polymer.

9 Claims, No Drawings

PLASTIC SKIN ENVELOPES FOR GLASS BOTTLES AND THE LIKE

BACKGROUND OF THE INVENTION

The concept of coating glass containers and the like in order to make them stronger and shatter-resistant is not new but is an idea which has received considerable attention lately because of increased safety standards demanded by the public and required by governments of glass bottle manufacturers.

The bottles or other containers are basically a glass vessel covered or coated with the plastic material. The coated containers are substantially lighter than an all glass container because the walls of the container can be thinner than conventional. As much as a third (⅓) less glass than conventional is employed.

The coated glass containers have numerous advantages over the all glass containers. They are shatter-resistant, light-weight, and have the ability to run on standard bottling and handling equipment. Additionally, the plastic surface can be directly printed on thereby eliminating the application of a label. It has been reported that the coated bottles withstood an average of 80 tipovers without shattering while conventional glass containers withstood an average of 4 tipovers. Further, the coated containers can be packed in corrugated containers without partitions and will resist breakage as well as standard glass containers packed with partitions. The light weight of the bottles also reduces shipping and handling costs. A still further advantage is that the coating, while permitting the bottles to run on conventional processing lines, reduces noise on the equipment. In addition, less breakage occurs during the filling operation which reduces overall cost and improves safety.

One type of plastic coating which has been suggested for this type of application is a nylon coating which imparts a smooth, clear finish to the glass when it is sprayed on. A second type, now in commercial use, uses an ethylene copolymer "skin" that envelops the glass bottle from neck to base (see e.g., U.S. Pat. No. 3,415,673). This copolymer coating has a rough finish that imparts a frosty appearance to the container. Another type of coating currently commercially available is based on an epoxy copolymer which is primarily designed to shield the contents of the bottle from ultraviolet light.

Another type of plastic currently commercially available is a foamed polystyrene label which is heat-shrunk onto the glass container. The foamed polystyrene has the advantages of being lightweight and has good shrinkage properties but is relatively expensive and its tensile strength properties are relatively poor.

It is therefore the object of this invention to provide a new lightweight, strong, uniform plastic coating which can be heat-shrunk onto a tubular substrate such as a glass bottle rapidly and uniformly, presenting a product with good opacity, which retains all of the advantages of the prior art materials and eliminates the deficiencies thereof. This and other objects of the invention will become apparent to those skilled in the art from the following detailed description.

SUMMARY OF THE INVENTION

This invention relates to a new lightweight, strong, uniform foamed layer containing laminate with good opacity which can be heat-shrunk onto a tubular substrate rapidly and uniformly. More particularly, the invention relates to producing the laminate by co-extruding a first and second plastic material under extrusion conditions such that the second plastic material is expanded, the shrinkage in the machine direction is about 70%–90% and the shrinkage in the transverse direction is about 5%–15%, the first plastic material being a low density polyethylene used in an amount such that the resulting ply therefrom is about 10%–20% of the thickness of the final laminate, and the second plastic is a mixture of an ethylene polymer and a small amount of a blowing agent. If desired, a third ply of the ethylene polymer can be formed by the co-extrusion.

The invention also relates to the resulting foamed layer containing laminate and glass containers coated with the laminate.

DESCRIPTION OF THE PREFERRED EMBODIMENTS

It has not been possible to obtain a satisfactory polyethylene foamed film by the flat sheet or cast film process. The pressure drop across the die while the resin is molten and the gas is still expanding results in large, irregular cells and pock marks on the film surface. The film also exhibited poor, uneven shrink characteristics, probably because of the irregular gas cell structure. We have, however, discovered a way to obtain a satisfactory product by the blown film method.

In producing the lightweight, strong, uniform foamed layer containing laminate of the present invention, two polyethylene plastics are co-extruded under carefully controlled conditions. We have found that it is not possible to obtain the objects of this invention by extruding high density polyethylene alone. It is conventional to extrude a molten thermoplastic material through a circular die, the extruded material being drawn from the die lip by nip rolls mounted at some distance above the die. The formed tube is then inflated by the introduction of pressurized air, expanding the tube to form a "bubble" having the desired tube diameter and wall gauge or thickness. The expanded tube is then passed through an annular cooling zone, where a gaseous heat exchange medium, such as air, is caused to impinge directly on the outer surface of the tube. Use of non-foamed polyethylene results in a material which does not have the requisite light weight. Extrusion of foamed high density polyethylene alone resulted in the leakage of air through the foamed blown film bubble making it impossible to constantly obtain the requisite uniformity.

In order to obtain the objectives of this invention, we have found that it is necessary to co-extrude a non-foamed low density polyethylene film and a foamed ethylene polymer film. We have also found that it is important to control the thickness of the individual plys in order to obtain the objects of this invention. The thickness of the non-foamed low density polyethylene must be about 10%–20%, preferably about 16% of the thickness of the final laminate. The final laminate generally has a thickness of about 10–15 mils, preferably about 13 mils. Accordingly, the preferred thickness of the non-foamed layer is about 2 mils.

The plastic used to produce the non-foamed ply of the two-ply laminate is low density polyethylene, i.e., a polyethylene having a density of 0.89–0.939 and a melt index of about 0.2–1.5. Preferably, the low density polyethylene has a density of about 0.920–0.926 and a melt index of about 0.30. The plastic which is foamed is a high density polyethylene, i.e., a polyethylene having a density in excess of 0.940 and a melt index of 0.2–1.0, a low density polyethylene, described above, or an ethylene-vinyl acetate copolymer having a density of 0.890–0.936, preferably 0.922–0.926, and a melt index of 0.2–0.8, preferably 0.2–0.3. Preferably, the high density polyethylene has a density of about 0.950 and a melt index of about 0.25.

The blowing agent can be any heat activated or chemically activated substance that is capable of being dispersed uniformly throughout the ethylene polymer resin without decomposing appreciably and which is capable of liberating a gas upon heating to an elevated temperature above the softening point of the ethylene polymer resin but below the decomposition termperature thereof. The blowing agent is preferably, but not necessarily, a finely divided heat decomposing solid. For a given ethylene resin, the choice of the blowing agent depends on the melting temperature of the polymer, the decomposition range of the blowing agent, the rate of heating to be used in foaming and the like. The choice of the preferred blowing agent to be used with a particular ethylene polymer resin can be arrived at by one skilled in the art through simple routine tests.

In our co-extrusion process, the blowing agent should have a decomposition temperature in the plastic in excess of about 380° F. (193° C.). Azodicarbonamide is the preferred blowing agent although other blowing agents such as N,N'-dinitroso-N,N'-dimethyl terephthalamide, N,N'-dinitrosopentamethylenetetramine, azobisisobutyronitrile, diazoaminobenzene, benzene sulfonyl hydrazide, toluene-(4)-sulfonyl hydrazide, benzene-1,3-disulfonyl hydrazide, diphenyl sulfone-3,3'-disulfonyl hydrazide, 4,4'-oxybis(benzene sulfonyl hydrazide), and the like, can be employed.

The amount of blowing agent must be kept within relatively narrow bounds. Generally, the amount ranges from about 0.1–2 weight percent based on the total weight of the ethylene polymer. Less than 0.1% is generally ineffective for forming foams. Above about 2%, the production of lightweight, strong foams having a uniform surface and small, uniform, closed cells becomes a "hit and miss" proposition. A preferred range of blowing agent is between about 0.5%–1% and is most preferably about 0.7%.

Since the proportion of blowing agent to polymer is relatively small, the homogeneity of distribution of the blowing agent throughout the polymer is critical to the quality of the resulting foam, particularly with respect to pore size and uniformity of pore distribution. Any convenient technique can be employed to mix the polymer and the blowing agent as long as a uniform mixture is attained.

A further description of the manner in which a solid, synthetic plastic material can be combined with a blowing agent and a foam can be formed can be found in U.S. Pat. No. 3,411,967, owned by the assignee of the present invention.

In producing the two-ply laminate of the present invention, the blowing agent is first intimately mixed with one of the ethylene polymers and the two resins are fed to the extrusion apparatus where they are each melted and then forced through the circular dies which have been adjusted to result in a two-ply film of the requisite thickness. The extrusion temperature used is that sufficient to cause decomposition of the blowing agent and thereby expand the ethylene polymer ply at the die lips. In general, the extrusion temperature is about 180°–230° C., preferably about 210°–220° C., and most preferably about 215° C., and will result in an about 1.5 to 3.0-fold increase, preferably about 2.20-fold increase, in the thickness of the foamed polymer ply. If desired, the unfoamed ply can be extruded at a lower temperature, e.g., as low as 160° C.; conveniently, it can be extruded at about 380° F. (193° C.). The speed of haul-off or draw-down of the foamed layer containing laminate is critical to the cell size uniformity. Generally, the speed is about 10–25 feet/minute, preferably about 15 feet/minute, and particular care is taken to ensure uniform haul-off or draw-down. It is not necessary to heat the co-extruded film to expand the foam as in U.S. Pat. No. 3,411,967.

The resulting two-ply, foamed layer laminated tube is then inflated by the introduction of pressurized air, expanding the tube to form a bubble having the desired tube diameter and wall gauge or thickness. The nonfoamed low density polyethylene prevents the leakage of air through the foamed blown film bubble. In accordance with conventional procedures, the expanded tube is then passed through an annular cooling zone, wherein a gaseous heat exchange medium, preferably air, is impinged directly on the outer surface of the tube. Although not presently preferred, the foam layer can be on the outside of the tube, and the air impinged on the inner surface.

Another critical factor in obtaining the objects of this invention is to effect the co-extrusion in such a manner as to give maximum machine direction orientation, i.e., minimum biaxial orientation. The extrusion conditions are controlled such that upon application of heat in forming the coated bottles as described below, shrinkage in the machine direction is about 70%–90% and shrinkage in the transverse direction is about 5%–15%. Preferably, the conditions are controlled such that the shrinkage in the machine direction is about 80% and shrinkage in the transverse direction is about 10%. This is principally accomplished by controlling the blow-up ratio which can vary from about 1:1—3:1 and is preferably about 1.5:1. The particular conditions used will vary depending on the particular polyethylene resins employed and the particular blowing agent, and can be readily determined by those skilled in the art through simple routine tests.

It will be recognized by those skilled in the art that, if desired, one additional foamed or non-foamed layer can also be provided. However, due to the exacting requirements of the products of this invention, a co-extruded three-ply foamed layer containing laminate has the maximum number of layers.

The coated containers are produced by slipping the foamed layer containing laminate tube over a glass or other type of container and heat-shrinking the tube so that it adheres tightly to the container. The containers are preferably preheated to aid in reducing shrink time. Temperatures for the heat-shrinking step generally vary from about 180°–260° C. and are preferably about 200°–220° C. Commercial considerations require a fast shrinkage time of a maximum of 30 seconds and preferably 15 seconds or less. By employing the various parameters described above, the laminate of the present invention satisfies these requirements and will form an adherent coating on the container in about 10–20 seconds, usually about 15 seconds, at 210° C.

The following Examples are presented in order to further illustrate the invention but are not intended to limit it. Unless otherwise specified throughout this specification and claims, all temperatures are in degrees centigrade and all parts and percentages are by weight.

EXAMPLE 1

A high density polyethylene resin having a density of 0.949 and a melt index of 1.0 was intimately and uniformly mixed with 0.70% of azodicarbonamide. The resin-blowing agent mixture was fed to a co-extrusion apparatus and simultaneously a low density polyethylene resin having a density of 0.926 and a melt index of 1.50 was also fed to the apparatus. The two resins were co-extruded at 195° C. with melt temperature of the high density polyethylene and foaming agent building to 218° C. to foam the high density polyethylene. The resulting laminated tube had a non-foamed layer of low density polyethylene of 2.0 mils thickness and an overall or combined density of 28.5 lbs/ft$^3$.

EXAMPLE 2

The process of Example 1 was repeated except that a different low density polyethylene resin was employed and had a density of 0.925 and a melt index of 0.33. The resulting two-ply laminate had a density of 28.0 lbs/ft$^3$, a non-foamed polyethylene layer of 1.5 mils and a foamed polyethylene layer of 10.5 mils.

EXAMPLE 3

Example 1 was repeated using a polyethylene having a density of 0.953 and a melt index of 0.30 as the high density polyethylene and a polyethylene having a density of 0.925 and a melt index of 0.33 as the low density polyethylene resin. The amount of foaming agent used was 0.6%. A 10 mil thick laminate was produced in which the non-foamed ply constituted 3 mils and the composite structure had a density of 39.0 lbs/ft$^3$.

EXAMPLE 4

Example 3 was repeated except that the amount of foaming agent used was 0.5%. A two-ply laminate was produced having the same dimensions as that of Example 3 except that the density was 38 lbs/ft$^3$.

EXAMPLE 5

The process of Example 2 was repeated using the same low density polyethylene resin to produce the unfoamed ply and a low density polyethylene resin having a density of 0.923 and a melt index of 0.30 to produce the foamed ply. The resulting two-ply laminate had a density of 28.0 lbs/ft$^3$. The total thickness was 11 mils, the unfoamed ply was 1.5 mils and the foamed ply was approximately 9.5 mils.

A second run was made increasing the unfoamed ply to 2.0 mils thickness and the foamed ply to 12 mils. The total 14 mils thick film had a density of 28.0 lbs/ft$^3$. The shrink time on glass bottles, as described in the following Example 6, was 12.0 seconds.

EXAMPLE 6

A high density polyethylene resin having a density of 0.953 and a melt index of 0.27 was intimately and uniformly mixed with 0.75% of azodicarbonamide. The mixture and a low density polyethylene resin, having a density of 0.925 and a melt index of 0.33 was fed into a co-extrusion apparatus in which the two plastics were co-extruded at a temperature of 205° C., the temperature building to 218° C. which resulted in a 2.2-fold expansion of the high density polyethylene. The speed of haul-off was maintained at 18 ft/min and a blow-up ratio of 1.8:1 was employed. The resulting two-ply foamed layer containing laminate had lay flat dimensions of 8-¾ × 9 inches, a total caliper of 12.5–14.5 mils of which 2 mils constituted the unfoamed layer. The average density of the laminate was 29.5 lbs/ft$^3$.

A length of the resulting laminate was slipped around a preheated glass bottle and subjected to a temperature of 210° C. for 15 seconds in an oven. The laminate uniformly shrank to adherently enclose the bottle. The resulting surface was smooth, having only gradual variations in caliper thereby allowing printing on the surface and exhibited small, uniform closed cells giving good opacity. The amount of shrinkage in the machine direction was 80% and the amount of shrinkage in the transverse direction was 18%.

Various changes and modifications can be made in the process and products of this invention without departing from the spirit and the scope thereof. The various embodiments set forth herein serve to further illustrate the invention but were not intended to limit it.

We claim:
1. A method of producing a seamless lightweight, strong, uniform, multi-ply, oriented foamed layer tubular laminate preform with good opacity adapted to be heat-shrunk onto a tubular substrate rapidly and uniformly, which comprises co-extruding through coaxial annular dies a first and second plastic material, said first plastic material comprising a low density polyethylene and said second plastic comprising an intimate mixture of an ethylene polymer and 0.1%–2% of a blowing agent having a decomposition range above the softening point of the ethylene polymer and below the decomposition temperature of the ethylene polymer, drawing down the resultant tubular foamed laminate at a speed of about 10-25 feet/minute; inflating said tubular foamed laminate wherein the blow-up ratio is about 1:1 to 3:1 such that shrinkage in the machine direction upon application of heat to the resulting laminate will be about 70%–90% and shrinkage in the transverse direction will be about 5%–15% ; cooling said foamed tubular laminate and cutting said laminate to length to form said tubular preform and wherein the non-foamed ply of said final laminated perform is about 10%–20% of the thickness thereof.

2. The method of claim 1 wherein the amount of blowing agent is between 0.5%–1%.

3. The method of claim 1 wherein the ethylene polymer is polyethylene or an ethylene-vinyl acetate copolymer.

4. The method of claim 1 wherein the blowing agent is azodicarbonamide.

5. The method of claim 1 wherein the shrinkage in the machine direction is about 80% and the shrinkage in the transverse direction is about 10% as a predominant result of the blow-up ratio.

6. The method of claim 1 wherein the blowing agent is azodicarbonamide, the amount of blowing agent is between about 0.5%–1%, the extrusion temperature is from about 180°–230° C, and the shrinkage in the machine direction is about 80% and the shrinkage in the transverse direction is about 10% as a predominant result of the blow-up ratio.

7. The method of claim 1 further comprising positioning a container in the annular space within said preform and shrinking said preform to adherently coat the container by heating to a temperature of about 180°–260° C.

8. The method of claim 7 wherein the temperature is about 200°–220° C. and the heat is applied for a maximum of 30 seconds.

9. The method of claim 7 wherein the container is constructed of glass.

* * * * *

UNITED STATES PATENT OFFICE
CERTIFICATE OF CORRECTION

PATENT NO. : 4,033,929
DATED : July 5, 1977
INVENTOR(S) : Stiles et al.

It is certified that error appears in the above-identified patent and that said Letters Patent are hereby corrected as shown below:

Col. 6, line 43, after the word "between" insert -- about --

Signed and Sealed this

Twentieth Day of December 1977

[SEAL]

Attest:

RUTH C. MASON
Attesting Officer

LUTRELLE F. PARKER
Acting Commissioner of Patents and Trademarks